(12) United States Patent
Kumar et al.

(10) Patent No.: US 12,075,393 B2
(45) Date of Patent: Aug. 27, 2024

(54) SYSTEM AND METHOD FOR DYNAMIC MULTICARRIER ALLOCATION TO NB-IOT DEVICES

(71) Applicant: Jio Platforms Limited, Ahmedabad (IN)

(72) Inventors: Ranjit Ma Kumar, Madhya Pradesh (IN); Smith Dholke, Maharashtra (IN); Ulhas D. Parab, Maharashtra (IN); Amol M. Kadam, Maharashtra (IN); Nikhil Ghadge, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 333 days.

(21) Appl. No.: 17/704,881

(22) Filed: Mar. 25, 2022

(65) Prior Publication Data
US 2022/0312414 A1    Sep. 29, 2022

(30) Foreign Application Priority Data
Mar. 26, 2021  (IN) .............................. 202121013485

(51) Int. Cl.
```
H04W 72/04      (2023.01)
H04L 5/00       (2006.01)
H04W 72/0446    (2023.01)
H04W 72/0453    (2023.01)
H04W 76/30      (2018.01)
```
(52) U.S. Cl.
CPC ....... *H04W 72/0446* (2013.01); *H04L 5/0055* (2013.01); *H04W 72/0453* (2013.01); *H04W 76/30* (2018.02)

(58) Field of Classification Search
None
See application file for complete search history.

(56) References Cited

U.S. PATENT DOCUMENTS

2019/0246432 A1* 8/2019 Hosseini ............... H04L 1/1864
2021/0409183 A1* 12/2021 Pawar ............... H04W 72/0453
(Continued)

*Primary Examiner* — Brandon M Renner
(74) *Attorney, Agent, or Firm* — FINNEGAN, HENDERSON, FARABOW, GARRETT & DUNNER, LLP (57) ABSTRACT

Present disclosure generally relates to wireless communication and particularly relates to system and method for dynamic multicarrier allocation to NB-IoT devices. Method includes receiving from PMS, PRB utilization data for a time slot or data packets, and comparing PRB utilization duration in received PRB utilization data with pre-defined threshold PRB utilization duration. Requesting via NB-IoT eNB, cumulative NACK percentage report corresponding to ARFCN/PRB, if PRB utilization duration is less than a pre-defined threshold. Method includes selecting, ARFCN/PRB for a time slot, based on PRB utilization data and cumulative NACK percentage report and pre-defined value. Method includes establishing connection between NB-IoT enabled devices and NB-IoT eNB, upon transmitting via LTE eNB, information associated with selected ARFCN/PRB for time slot, to NB-IoT eNB. Method includes notifying LTE eNB, representative of utilization of ARFCN/PRB as non-anchor carrier. Method includes allocating ARFCN/PRB as non-anchor carrier to schedule NB-IoT enabled devices for data transfer in selected time slot.

14 Claims, 4 Drawing Sheets

(56) References Cited

U.S. PATENT DOCUMENTS

| | | | |
|---|---|---|---|
| 2022/0052824 A1* | 2/2022 | Kim | H04L 1/1854 |
| 2022/0201671 A1* | 6/2022 | Wang | H04W 72/0446 |
| 2023/0124521 A1* | 4/2023 | Babaei | H04L 1/1825 |
| | | | 370/329 |
| 2023/0403655 A1* | 12/2023 | Wang | H04W 52/243 |

* cited by examiner

SYSTEM AND METHOD FOR DYNAMIC MULTICARRIER ALLOCATION TO NB-IOT DEVICES

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to wireless communication. More particularly, the present disclosure relates to a system and a method for dynamic multicarrier allocation to Narrow Band Internet of things (NB-IoT) devices.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, Third Generation Partnership Project (3GPP) may include a new radio interface such as a Narrowband Internet of Things (NB-IoT) as a release 13 feature that may reuse various principles and building blocks of a Long-Term Evolution (LTE) physical layer and higher protocol layers to enable rapid standardization and product development. The NB-IoT may be an independent radio interface which may be closely connected with the LTE and hence may be included in LTE specifications. The NB-IoT may not be backward compatible with the LTE. The NB-IoT technology may be designed for longer battery life and to be cost-effective. NB-IoT may have been designed to offer extended coverage compared to the traditional Global System for Mobile communications (GSM) networks. NB-IoT may improve Uplink (UL) capacity for users in poor network coverage areas through single tone transmissions. Further, new physical layer signals and channels, such as synchronization signals and physical Random-Access Channel (RACH) may be designed to meet the demanding requirement of extended coverage and ultra-low device complexity. Higher protocols, signalling, and physical-layer processing requirements may greatly be simplified to reduce User Equipment (UE) power consumption and complexity.

Further, many features of the LTE such as carrier aggregation, measurements to monitor channel quality, dual connectivity, QoS may be excluded since these features may not be effective in providing longer battery life and may not be cost-effective. The 3GPP may provide a multicarrier feature in the NB-IoT which may increase the resource allocation capacity of the NB-IoT cell. An NB-IoT-enabled device may always have one anchor carrier of 180 kHz. However, allocating another non-anchor carrier to NB-IoT enabled device may require another frequency space of 180 kHz bandwidth, thereby increasing the space and the cost in such an approach. The NB-IoT may use an effective bandwidth of 180 kHz and always may have one anchor carrier of the bandwidth. In addition, the 3GPP may facilitate adding a non-anchor carrier to the NB-IoT-enabled device which may be the same as providing the NB-IoT-enabled device additional carrier for data transfer. While the NB-IoT enabled device transmits data on a non-anchor carrier, the anchor carrier may be utilized for RACH and paging process to serve other NB-IoT enabled devices to avoid delay in communication for the other NB-IoT enabled devices. However, due to limited bandwidth and a huge number of NB-IoT enabled devices of a certain application, a single carrier may not be enough and may cause a delay in communication for other NB-IoT enabled devices belonging to other applications.

To implement such a feature, there is, therefore, a need for an improved system and method for dynamic multicarrier allocation to NB-IoT enabled devices.

OBJECTS OF THE PRESENT DISCLOSURE

Some of the objects of the present disclosure, which at least one embodiment herein satisfies areas listed hereinbelow.

It is an object of the present disclosure to provide a robust, effective, and improved system and method for dynamic multicarrier allocation to Narrow Band Internet of Things (NB-IoT) enabled devices.

It is another object of the present disclosure to enable maximum utilization of radio resources available to an operator across LTE and NB-IoT and increase NB-IoT cell throughput and user throughput.

It is another object of the present disclosure to select the best ARFCN or PRB as a non-anchor carrier for at least a one-time slot, based on PRB utilization data and cumulative NACK percentage report.

It is yet another object of the present disclosure to allocate ARFCN or PRB as a non-anchor carrier to schedule the plurality of NB-IoT enabled devices for data transfer corresponding to the selected time slot when an Acknowledgement (ACK) is received from LTE eNB.

It is another object of the present disclosure to provide additional data input to Service Capability Exposure Function (SCEF) which may be utilized for optimum utilization of NB-IoT resources.

It is another object of the present disclosure to select the best ARFCN or the PRB as a non-anchor carrier for at least one time slot, to avoid allocation of the non-anchor carrier for a particular NB-IoT enabled device in case the non-anchor carrier is not utilized but has a higher NACK percentage for that NB-IoT enabled device among the available ARFCN or the PRB for the non-anchor carrier.

It is another object of the present disclosure to select the best ARFCN or PRB to avoid delay in communication from the plurality of NB-IoT enabled devices, even when the different NB-IoT devices are used for different applications.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for dynamic multicarrier allocation to Narrow Band-Internet of Things (NB-IoT) enabled devices. The system receives from a performance management system, Physical Resource Block (PRB) utilization data corresponding to at least one of at least one-time slot and a set of data packets, upon requesting for the PRB utilization data via a Long-Term Evolution evolved Node B (LTE eNB). Further, the system compares at least one PRB utilization duration in the received PRB utilization data with a pre-defined threshold PRB utilization duration. Furthermore, the system requests via a Narrow Band Internet of Things evolved Node B (NB-IoT eNB), a cumulative Negative Acknowledgement (NACK) percentage report corresponding to at least one of an Absolute Radio Frequency Channel Number (ARFCN) or a PRB associated with at least one non-anchor carrier, if the at least one PRB utilization duration is less than the pre-defined threshold PRB utilization duration. Thereafter, the system selects, at least one of the ARFCN of the PRB associated with at least one non-anchor carrier for at least one of at least one-time slot and a set of data packets, based on the PRB utilization data, the cumulative NACK percentage report, and a pre-defined value for at least one of the ARFCN of the PRB. Further, the system establishes a connection between a plurality of NB-IoT enabled devices and the NB-IoT eNB, upon transmitting via the LTE eNB, information associated with the selected at least one of the ARFCN of the PRB for at least one-time slot to the NB-IoT eNB. Furthermore, the system notifies to the LTE eNB, representative of utilization of at least one of the ARFCN or the PRB as the non-anchor carrier. Finally, the system allocates at least one of the ARFCN or the PRB as a non-anchor carrier to schedule the plurality of NB-IoT enabled devices for data transfer corresponding to the selected time slot when an Acknowledgement (ACK) is received from the LTE eNB in response to the notification.

In an aspect, the system indicates to the LTE eNB, the release of each of at least one of the ARFCN or the PRB at the end of the allocated time slot. Further, the resource allocation system transmits the request for the cumulative NACK percentage report to a Mobility Management Entity (MME) via the NB-IoT eNB. Furthermore, the system receives from the MME, the requested cumulative NACK percentage report via the NB-IoT eNB, in response to the transmitted request.

In another aspect, the system determines at least one of the less utilized and fewer error percentages among at least one of the ARFCN or the PRB. Based on establishing the connection between a plurality of NB-IoT enabled devices and the NB-IoT eNB, the system requests from the NB-IoT eNB via the MME, a NACK percentage report corresponding to at least one of the ARFCN or the PRB for each of the plurality of NB-IoT enabled devices and for each of the ARFCN. Furthermore, the system selects and allocates at least one of the ARFCN or the PRB to each of the plurality of NB-IoT enabled devices, using a Radio Resource Control (RRC) reconfiguration connection, based on the NACK percentage of each of the plurality of NB-IoT enabled devices. Thereafter, the system performs a RRC release for each of the plurality of NB-IoT enabled devices. Further, the system transmits a NACK percentage report corresponding to at least one of the ARFCN or the PRB of each of the plurality of NB-IoT enabled devices to the MME via the NB-IoT eNB, upon the RRC release.

In yet another aspect, upon requesting the NCK percentage report, if the NACK percentage report is not available in the MME, then the resource allocation system via the NB-IoT eNB allocates the non-anchor carrier based on the current utilization of available ARFCN for the non-anchor carriers.

In an aspect, the system negotiates data of available ARFCN in respect of the received NACK percentage report for available ARFCN for each of the plurality of NB-IoT enabled devices. Further, the system generates a configuration for each of the plurality of NB-IoT-enabled devices for the selected time slot. Furthermore, the system configures each of the ARFCN as the non-anchor carrier to each of the plurality of NB-IoT enabled devices. Thereafter, the system reconfigures the non-anchor carrier for each of the plurality of NB-IoT enabled devices when a NACK percentage of the non-anchor carrier exceeds a pre-defined threshold for a certain duration during the data transfer.

The present disclosure further provides for a method of dynamic multicarrier allocation to Narrow Band-Internet of Things (NB-IoT) enabled devices. The method includes receiving from a performance management system, Physical Resource Block (PRB) utilization data corresponding to at least one of at least one-time slot and a set of data packets, upon requesting for the PRB utilization data via a Long-Term Evolution evolved Node B (LTE eNB). Further, the method includes comparing at least one PRB utilization duration in the received PRB utilization data with a pre-defined threshold PRB utilization duration. Furthermore, the method includes requesting via a Narrow Band Internet of Things evolved Node B (NB-IoT eNB), a cumulative Negative Acknowledgement (NACK) percentage report corresponding to at least one of an Absolute Radio Frequency Channel Number (ARFCN) or a PRB associated with at least one non-anchor carrier, if the at least one PRB utilization duration is less than the pre-defined threshold PRB utilization duration. Thereafter, the method includes selecting, at least one of the ARFCN or the PRB associated with at least one non-anchor carrier for at least one of at least one-time slot and a set of data packets, based on the PRB utilization data, the cumulative NACK percentage report, and a pre-defined value for at least one of the ARFCN or the PRB. Further, the method includes establishing a connection between a plurality of NB-IoT enabled devices and the NB-IoT eNB, upon transmitting via the LTE eNB, information associated with the selected at least one of the ARFCN or the PRB for at least one-time slot to the NB-IoT eNB. Furthermore, the method includes notifying the LTE eNB, representative of the utilization of at least one of the ARFCN or the PRB as the non-anchor carrier. Finally, the method includes allocating at least one of the ARFCN or the PRB as a non-anchor carrier to schedule the plurality of NB-IoT enabled devices for data transfer corresponding to the selected time slot, when an Acknowledgement (ACK) is received from the LTE eNB in response to the notification.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a robust, effective, and improved system and method for dynamic multicarrier allocation to Narrow Band Internet of Things (NB-IoT) enabled devices. Embodiments herein enable maximum utilization of radio resources available to the operator across LTE and NB-IoT. Embodiments herein increase NB-IoT cell throughput and user throughput. Additional data input provided to Service Capability Exposure Function (SCEF) may be utilized for optimum utilization of NB-IoT resources. Embodiments herein allocate at least one of the ARFCN or the PRB as a non-anchor carrier to schedule the plurality of NB-IoT enabled devices for data transfer corresponding to the selected time slot, when an ACK is received from the LTE eNB, which does not require another frequency space, thereby frequency space and the cost is minimized. Selecting the best ARFCN or the PRB associated with at least one non-anchor carrier for at least one time slot, avoids allocation of the non-anchor carrier for a particular NB-IoT enabled device in case the non-anchor carrier is not utilized but has a higher NACK percentage for that NB-IoT enabled device among the available ARFCN or the PRB for the non-anchor carrier. Selecting ARFCN or the PRB associated with at least one non-anchor carrier for at least one time slot for each of the NB-IoT enabled devices, provides sufficient bandwidth and does not cause a delay in communication from the plurality of NB-IoT enabled devices, even when different NB-IoT devices are used for different applications.

A provider of wireless communication services may manage wireless access networks that include a large number of network devices. For example, a wireless access network may provide communication services for devices in the Internet of Things (IoT) applications. Such devices may communicate using Machine-To-Machine (M2M) communication, such as machine-type communication (MTC), a type of M2M communication standardized by the $3^{rd}$ Generation Partnership Project (3GPP), and/or another type of M2M communication. Examples of MTC devices may include utility meters, parking meters, road sensors, environmental sensors, security sensors, traffic and/or road lights, traffic cameras, advertising displays, vehicle telematics devices, point-of-sale terminals, vending machines, health monitoring devices, remote diagnostics devices, access control device, manufacturing controllers, and/or other types of devices. The use of MTC devices is envisioned to increase exponentially and may result in a large number of such devices being serviced by a wireless access network. Estimates indicate that the number of MTC devices within a wireless operator's network may increase to hundreds of millions of devices communicating with each other autonomously with little to no human intervention.

A wireless network, such as a Long-Term Evolution (LTE) access network (e.g., an evolved packet core (EPC) network), based on the LTE standard specified by the $3^{rd}$ Generation Partnership Project (3GPP), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the data consumption of MTC devices may be small compared to other types of devices, such as mobile phones used for voice communication or streaming content. Therefore, the use of large bandwidth channels, such as an LTE channel, for wirelessly communicating with MTC devices may be an inefficient use of radio link resources.

One technology developed for IoT applications that do not require large amounts of data is the Narrow Band (NB) IoT (NB-IoT) technology. The NB-IoT is a Low Power Wide Area (LPWA) technology that uses 200 Kilohertz (kHz) channels, with their own guard bands, for sending small amounts of data. The use of NB-IoT channels may result in better signal penetration in hard-to-reach areas, such as areas likely to be occupied by MTC devices (e.g., a utility meter installed in a location that shadows or fades wireless signals). Furthermore, the use of NB-IoT channels may result in lower energy consumption and/or cheaper component cost.

An LTE wireless access network may utilize multiple technology types and may function as a hybrid network. For example, the LTE wireless access network may use LTE channels for high data rate communications and NB-IoT channels (also referred to as category Cat-M2) for low data rate communications. Furthermore, some LTE wireless networks may utilize additional technologies for communicating with MTC devices, such as 1.4 MHz wide enhanced MTC (eMTC) channels (also referred to as category Cat-M1) used for MTC communications that require medium data rate.

An LTE channel may include narrowband sub-carriers that may carry data modulated using Orthogonal Frequency Division Multiplexing (OFDM). The sub-carriers are offset from a central Direct Current (DC) sub-carrier that may not be modulated to carry data. A particular number (e.g., 12) of sub-carriers may be allocated for a particular number of time slots as a physical resource block (PRB). The PRB may be the smallest element of resource allocation assigned by an eNode B scheduler. An LTE PRB may include 12 sub-carriers of 15 kHz bandwidth for a bandwidth of 180 kHz. Thus, without its guard band, an NB-IoT channel may fit inside the PRB. Therefore, efficient use of an LTE channel may be to dedicate particular PRBs to particular NB-IoT channels.

Figure 1:
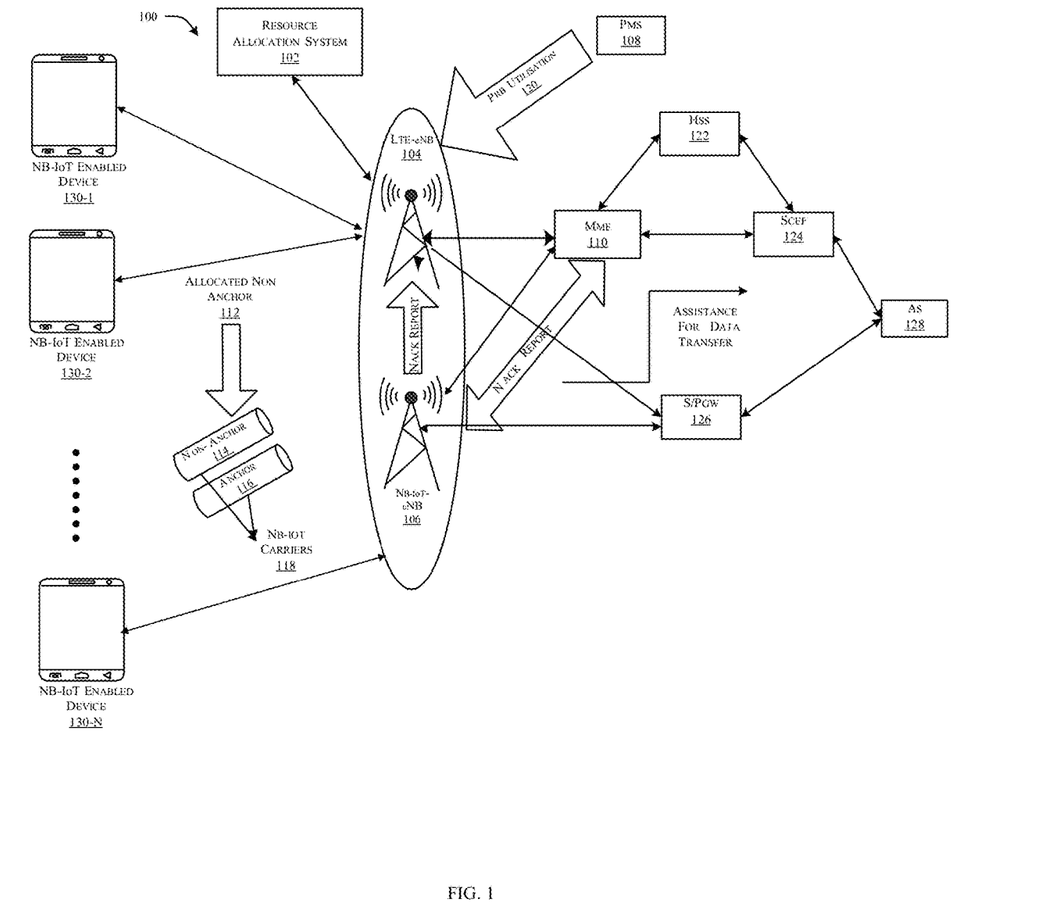
FIG. 1 illustrates an exemplary network architecture in which or with which the system of the present disclosure can be implemented for dynamic multicarrier allocation to Narrow Band Internet of things (NB-IoT) enabled devices, in accordance with an embodiment of the present disclosure.

Referring to FIG. 1 that illustrates an exemplary network architecture in which or with which the system of the present disclosure may be implemented for dynamic multicarrier allocation to Narrow Band Internet of things (NB-IoT) devices. As illustrated, the exemplary architecture (100) includes a resource allocation system (102) for facilitating dynamic multicarrier allocation to Narrow Band Internet of things (NB-IoT) enabled devices (130-1, 130-2 to 130-N) (collectively hereinafter referred to as "NB-IoT enabled devices (130)" and individually referred as "NB-IoT enabled device (130)"), a Long term Evolution evolved Node B (LTE-eNB) (104), a Narrow Band Internet of Things evolved Node B (NB-IoT-eNB) (106).

In some implementations, NB-IoT enabled devices (130) may correspond to an embedded wireless device that communicates wirelessly with other devices over a Machine-to-machine (M2M) interface using a Machine-Type-communication (MTC) and/or any other type of M2M communication. As an example, NB-IoT enabled devices (130) may be electrically connected to a sensor device, an actuator device, a microcontroller controlling one or more sensors, a microcontroller controlling one or more actuators, a microcontroller that performs data processing, and/or any other type of MTC device. Examples of such devices may include, but not limited to, an energy consumption monitoring device (e.g., utility meter, energy meter), a health monitoring device (e.g., a blood pressure monitoring device, a blood glucose monitoring device, and so on), an asset tracking device (e.g., a system monitoring the geographic location of a fleet of vehicles, and so on), a people/animal tracking device (e.g., a system monitoring the geographic location of a humans, animals and so on), a vehicle lock tracking device (e.g., status of the lock, and so on), a traffic management device (e.g., a traffic light, traffic camera, road sensor, road illumination light, and so on), a device controlling one or more functions of a vehicle (e.g., a climate control system, an engine monitoring system, and so on), a device controlling an electronic sign (e.g., an electronic billboard, and so on), a device controlling a manufacturing system (e.g., a robot arm, an assembly line, and so on), a device controlling a security system (e.g., a camera, a motion sensor, a window sensor, and so on), a device controlling a power system (e.g., a smart grid monitoring device, a utility meter, a fault diagnostics device, and so on), a device controlling a financial transaction system (e.g., a point-of-sale terminal, a vending machine, a parking meter, and so on), and/or any other type of electronic device.

In other implementations, NB-IoT enabled devices (130) may include, but are not limited to, a handheld wireless communication device (e.g., a mobile phone, a smartphone, a phablet device, and so on); a wearable computer device (e.g., a head-mounted display computer device, a head-mounted camera device, a wristwatch computer device, and so on), a Global Positioning System (GPS) device, a laptop computer, a tablet computer, or another type of portable computer, a media-playing device, a portable gaming system, a home appliance device, a home monitoring device, and/or any other type of computing device with wireless communication capabilities.

Further, an access network (not shown in FIG. 1) may provide access to the core network (not shown in FIG. 1) for wireless devices, such as the NB-IoT enabled device (130). The access network may enable NB-IoT-enabled devices (130) to provide mobile telephone service and/or data services to NB-IoT-enabled devices (130). The access network may establish a packet data network connection between NB-IoT enabled device (130) and the core network. For example, an access network may establish an Internet Protocol (IP) connection between NB-IoT enabled device (130) and core network. In some implementations, the access network may include a Long-Term Evolution (LTE) access network (e.g., an evolved packet core (EPC) network) based on the LTE standard specified by the $3^{rd}$ Generation Partnership Project (3GPP). In other implementations, the access network may include a Code Division Multiple Access (CDMA) access network based on, for example, a CDMA2000 standard. For example, the CDMA access network may include a CDMA enhanced High-Rate Packet Data (eHRPD) network (which may provide access to an LTE access network). Further, the core network may include, but is not limited to, a Local Area Network (LAN), a Wide Area Network (WAN), a Metropolitan Area Network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks, and the like. The core network may allow the delivery of Internet Protocol (IP) services to NB-IoT enabled devices (130), and may interface with other external networks. The core network may include one or more server devices and/or network devices, or other types of computation or communication devices. In one example implementation, the core network may include an Internet Protocol Multimedia Subsystem (IMS) network (not shown in FIG. 1). The IMS network may include a network for delivering IP multimedia services as specified by 3GPP or other standards/protocols and may provide media flows between NB-IoT enabled devices (130) and external IP networks or external circuit-switched networks (not shown in FIG. 1).

The access network may include a base station such as the LTE-eNB (104) and the NB-IoT eNB (106) and the NB-IoT enabled device (130) may wirelessly communicate with the access network via the LTE-eNB (104) and/or the NB-IoT eNB (106). The base station such as the LTE-eNB (104) and the NB-IoT eNB (106) may service the NB-IoT enabled devices (130-1 to 130-N). In other words, NB-IoT enabled devices (130-1 to 130-N) may be located within the geographic area serviced by the base station such as the LTE-eNB (104) and the NB-IoT eNB (106). The base station may broadcast information relating to available NB-IoT channels via which NB-IoT enabled devices (130) may wirelessly communicate with the access network. The NB-IoT-enabled devices (130) may communicate with a base station via a selected NB-IoT channel(s). The Base station may be part of a LTE eNodeB base station device. An eNodeB base station device may include one or more devices (e.g., base stations) and other components and functionality that allow NB-IoT enabled devices (130) to wirelessly connect to access the network. The eNodeB base station device may include or be associated with one or more cells. For example, each cell may include a radio frequency (RF) transceiver facing a particular direction. The eNB may perform radio channel modulation or demodulation as well as channel coding or decoding and multiplexing or de-multiplexing. System information is broadcast in each cell on the radio interface Downlink (DL) to provide basic information to NB-IoT enabled device (130) as a prerequisite to access the network. Other functions of the eNB comprise the transfer of dedicated Network Attached Storage (NAS) information and non-3GPP dedicated information, the transfer of NB-IoT enabled device (130) radio access capability information services. An eNode B base station device may interface with access network via an interface referred to as an S1 interface, which may be split into a control plane S1-MME interface to communicate with a Mobility Management Entity (MME) device (110) in the access network and a data plane S1-U interface to communicate with a core network via a Serving Gateway (SGW) device and/or a Packet Data Network Gateway (PGW) device (126) (referred as S/PGW in FIG. 1).

Further, the MME (110) may be a control node that processes the signaling between the NB-IoT enabled device (130) and the core network. The protocols running between the NB-IoT enabled devices (130) and the core network may be known as the Non-Access Stratum (NAS) protocols. The main function of the MME may include functions related to bearer management, this includes the establishment, maintenance, and release of the bearers and is handled by the session management layer in the NAS protocol, functions related to connection management, this includes the establishment of the connection and security between the network and NB-IoT enabled device (130) and is handled by the connection or mobility management layer in the NAS protocol layer.

Further, the architecture (100) may include a Service Capability Exposure Function (SCEF) (124) may be the interface for small data transfers and control messaging between enterprises and the operators of the core network. The SCEF (124) may provide Application Programming Interfaces (APIs) to the enterprises for the small data transfers and control messages and may use 3GPP-defined interfaces with the network elements in the operators of the core network in its performance of its functions such as APIs for various services such as delayed or scheduled data transfer, Non-Internet Protocol (IP) Data Delivery (NIDD), exposing capabilities for new revenue. Furthermore, the architecture (100) may include a Home Subscriber Server (HSS) (122), which is a database that contains user-related and subscriber-related information. The HSS (122) may also provide a user authentication and access authorization. Thereafter, the architecture (100) may include an Application Server (AS) (128), which hosts IoT service and additional features. Furthermore, the architecture (100) may include a Performance Management System (PMS) (108), which may collect Radio Access Network (RAN) Key performance Indicators (KPI) and busy or non-busy schedule or resource utilization and other features.

As shown in FIG. 1, the PRB utilization data (120) may be transmitted from the PMS (108) to the LTE eNB (104). The LTE eNB (104) may be in communication with the MME (110), the S/PGW (126), the HHS (122), the SCEF (124), and the AS (128) either directly or via a communication network or one or more units mentioned above. The NACK percentage report (either cumulative or non-cumulative) may be communicated between the NB-IoT eNB (106) and the MME (110) or with the LTE eNB (104). The LTE eNB (104) and NB-IoT eNB (106) may be controlled NB-IoT-and-LTE eNB. The allocated non-anchor carrier (112) may be transmitted to the NB-IoT carriers (118) via non-anchor carriers (114) or anchor carriers (116). The whole communication may be initiated via the NB-IoT-enabled devices (130).

Although FIG. 1 shows exemplary components of architecture (100), in other implementations, architecture (100) may include fewer components, different components, differently arranged components, or additional functional components than depicted in FIG. 1. Additionally, or alternatively, one or more components of the architecture (100) may perform functions described as being performed by one or more other components of the architecture (100).

In some implementations, the resource allocation system (102) may be a standalone device and may be communicatively coupled to the LTE-eNB (104) and the NB-IoT eNB (106). In another implementation, the resource allocation system (102) may be associated with the LTE-eNB (104) and/or the NB-IoT eNB (106). The resource allocation system (102) may be implemented in an electronic device, a mobile device, a server, and the like. Such server may include, but are not limited to, a standalone server, a remote server, a cloud server, a dedicated server, and the like.

Figure 2:
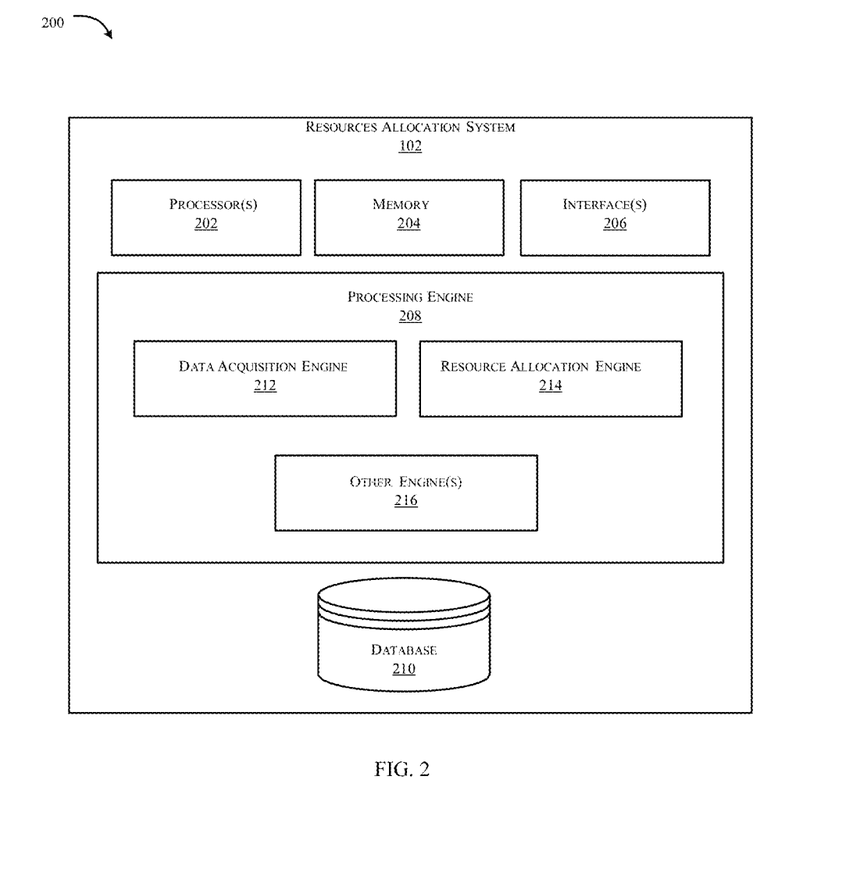
FIG. 2 illustrates an exemplary representation of resource allocation system for dynamic multicarrier allocation to NB-IoT enabled devices, in accordance with an embodiment of the present disclosure.

In an embodiment, the resource allocation system (102) may include one or more processors coupled with a memory, wherein the memory may store instructions which when executed by the one or more processors may cause the resource allocation system (102) to perform the dynamic multicarrier allocation to the plurality of NB-IoT devices (130). FIG. 2 with reference to FIG. 1, illustrates an exemplary representation of resource allocation system (102) for facilitating dynamic multicarrier allocation to the plurality of NB-IoT devices (130), in accordance with an embodiment of the present disclosure. In an aspect, the resource allocation system (102) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the resource allocation system (102). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the resource allocation system (102) may include an interface(s) 206. The interface(s) 206 may comprise a variety of interfaces, for example, interfaces for data input and output devices, referred to as I/O devices, storage devices, and the like. The interface(s) 206 may facilitate communication of the resource allocation system (102). The interface(s) 206 may also provide a communication pathway for one or more components of the resource allocation system (102). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In the examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the resource allocation system (102) may comprise the machine-readable storage medium storing the instructions and the processing resource to execute the instructions, or the machine-readable storage medium may be separate but accessible to the resource allocation system (102) and the processing resource. In other examples, the processing engine(s) (208) may be implemented by electronic circuitry.

The processing engine (208) may include one or more engines selected from any data acquisition engine (212), resource allocation engine (214), and other engines (216). In an embodiment, the data acquisition engine (212) of the resource allocation system (102) may request/receive Physical Resource Block (PRB) utilization data, a cumulative Negative Acknowledgement (NACK) percentage report, a NACK percentage report of respective NB-IoT enabled devices (130), and the like. The resource allocation engine (214) may allocate at least one of the ARFCN or the PRB as a non-anchor carrier.

In an embodiment, the resource allocation system (102) may receive from a Performance Management System (PMS) (108) which is communicatively coupled to the LTE-eNB (104), Physical Resource Block (PRB) utilization data (120) corresponding to at least one-time slot and/or a set of data packets, upon requesting for the PRB utilization data via a Long-Term Evolution evolved Node B (LTE eNB). The PRB utilization data may refer to several downlink PRBs allocated to users per unit time. In another embodiment, the resource allocation system (102) may compare at least one PRB utilization duration in the received PRB utilization data (120) with a pre-defined threshold PRB utilization duration. Further, the resource allocation system (102) may request via a Narrow Band Internet of Things evolved Node B (NB-IoT eNB) (106), a cumulative Negative Acknowledgement (NACK) percentage report corresponding to at least one of an Absolute Radio Frequency Channel Number (ARFCN) or a PRB associated with at least one non-anchor carrier, if the at least one PRB utilization duration is less than the pre-defined threshold PRB utilization duration. For requesting the cumulative NACK percentage report corresponding to at least one of the ARFCN or the PRB, the resource allocation system (102) may transmit the request for the cumulative NACK percentage report to a Mobility Management Entity (MME) (110) via the NB-IoT eNB (106). Further, the resource allocation system (102) may receive from the MME (110), the requested cumulative NACK percentage report via the NB-IoT eNB (106), in response to the transmitted request. If the NACK percentage report is not available with the MME (110), then the resource allocation system (102) via the NB-IoT eNB (106) may allocate the non-anchor carrier (112) based on a current utilization of available ARFCN for the non-anchor carriers.

In an embodiment, the resource allocation system (102) may select, at least one of the ARFCN or the PRB associated with at least one non-anchor carrier for at least one-time slot and/or a set of data packets, based on the PRB utilization data (120), the cumulative NACK percentage report, and a pre-defined value for at least one of the ARFCN or the PRB.

The cumulative Negative Acknowledgment (NACK) may refer that, the receiver explicitly notifies the sender of which packets, messages, or segments were received incorrectly in a stream and thus may need to be retransmitted. For selecting at least one of the ARFCN or the PRB, the resource allocation system (102) may determine at least one of the less utilized and less error percentage among at least one of the ARFCN or the PRB.

In an embodiment, the resource allocation system (102) may establish a connection between a plurality of NB-IoT enabled devices (130) and the NB-IoT eNB (106), upon transmitting via the LTE eNB (104), information associated with the selected at least one of the ARFCN or the PRB for the at least one-time slot to the NB-IoT eNB (106). For establishing the connection between the plurality of NB-IoT enabled devices (130) and the NB-IoT eNB (106), the resource allocation system (102) may negotiate data of available ARFCN in respect of the received NACK percentage report for available ARFCN for each of the plurality of NB-IoT enabled devices (130). Further, the resource allocation system (102) may generate a configuration for each of the plurality of NB-IoT enabled devices (130) for the selected time slot and configure each of the ARFCN as the non-anchor carrier to each of the plurality of NB-IoT enabled devices (130). Further, the resource allocation system (102) may reconfigure the non-anchor carrier for each of the plurality of NB-IoT enabled devices (130), when a NACK percentage of the non-anchor carrier exceeds a pre-defined threshold for a certain duration during the data transfer.

Based on establishing the connection between a plurality of NB-IoT enabled devices (130) and the NB-IoT eNB (106), the resource allocation system (102) may request from the NB-IoT eNB (106) via the MME (110), a NACK percentage report corresponding to at least one of the ARFCN or the PRB for each of the plurality of NB-IoT enabled devices (130) and for each of the ARFCN. Further, the resource allocation system (102) may select and allocate at least one of the ARFCN or the PRB to each of the plurality of NB-IoT enabled devices (130), using a Radio Resource Control (RRC) reconfiguration connection, based on the NACK percentage of each of the plurality of NB-IoT enabled devices (130). Further, the resource allocation system (102) may perform a RRC release for each of the plurality of NB-IoT enabled devices (130). Upon RRC release, the resource allocation system (102) may transmit a NACK percentage report corresponding to at least one of the ARFCN or the PRB of each of the plurality of NB-IoT enabled devices (130) to the MME (110) via the NB-IoT eNB (106).

Further, the resource allocation system (102) may notify to the LTE eNB (104), representative of the utilization of at least one of the ARFCN or the PRB as the non-anchor carrier. In an embodiment, the resource allocation system (102) may allocate at least one of the ARFCN or the PRB as a non-anchor carrier (112) to schedule the plurality of NB-IoT enabled devices (130) for data transfer corresponding to the selected time slot, when an Acknowledgement (ACK) is received from the LTE eNB (104) in response to the notification. Further, the resource allocation system (102) may indicate to the LTE eNB (104), the release of each of at least one of the ARFCN or the PRB at the end of the allocated time slot.

In an embodiment, the NB-IoT enabled devices (130) may communicate with the resource allocation system (102) via a set of executable instructions residing on any operating system, including but not limited to, Android™, iOS™, Kai OS™, and the like. In an embodiment, NB-IoT enabled devices (130) may include, but are not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, touch-enabled screen, electronic pen and the like. It may be appreciated that the NB-IoT enabled devices (130) may not be restricted to the mentioned devices and various other devices may be used. A smart computing device may be one of the appropriate systems for storing data and other private/sensitive information.

Figure 3:
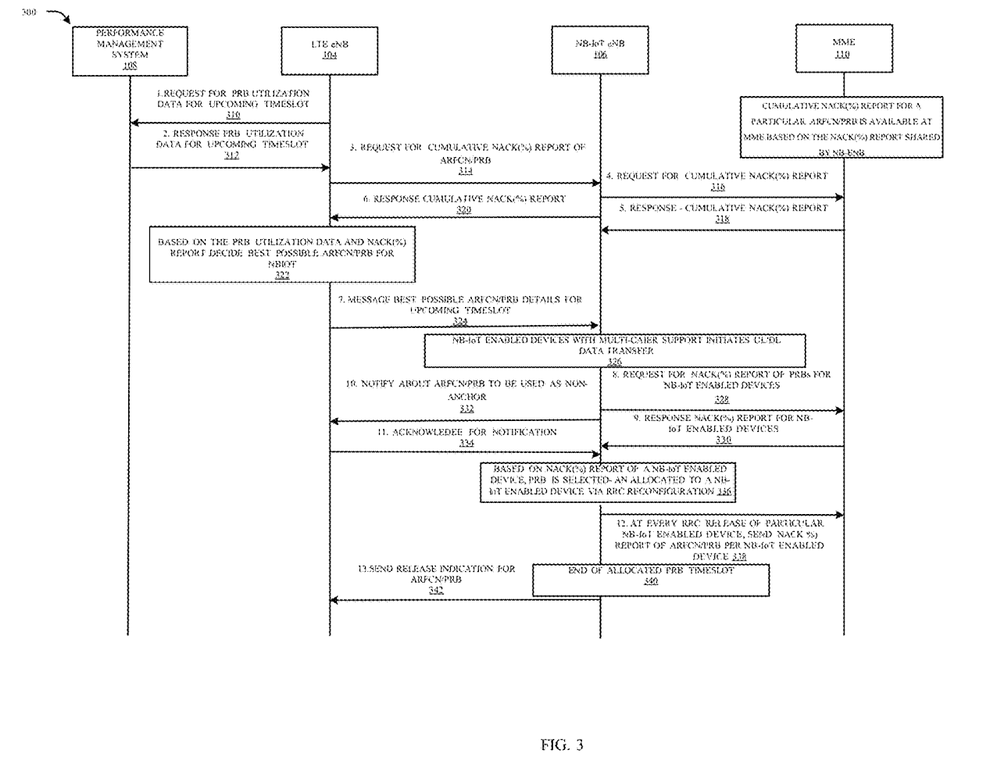
FIG. 3 illustrates an exemplary sequence diagram of dynamic multicarrier allocation to NB-IoT enabled devices, in accordance with an embodiment of the present disclosure.

FIG. 3 illustrates an exemplary sequence diagram of dynamic multicarrier allocation to NB-IoT devices, in accordance with an embodiment of the present disclosure.

Initially, the Performance Management System (PMS) (108) may include PRB utilization of each cell for the pre-defined time period (for example 15 minutes) granularity. The PMS (108) may analyze the data of the last configurable number of days and the last configurable number of weeks of the same day of each cell and identify PRB utilization of each cell for an upcoming configurable time slot.

At step 310, the LTE eNB (104) may request for Physical Resource Block (PRB) utilization data (120) from the PMS (108), for the upcoming timeslot. For instance, to initiate the process of multicarrier allocation, the request may be generated for at least one PRB. At step 312, the PMS (108) may transmit the PRB utilization data (120) of the upcoming slots for the LTE eNB (104). The PMS (108) may compare at least one PRB utilization duration in the received PRB utilization data (120) with a pre-defined threshold PRB utilization duration. For instance, the PMS (108) may include a PRB utilization of each of a plurality of cells for a pre-defined time interval granularity (configurable). The PMS (108) may analyze the data of the last configurable number of days and the last configurable number of weeks of the same day of each of the plurality of cells and identify the PRB utilization of each cell for an upcoming configurable time slot. The predefined time interval for example may be one of, but not limited to, 15 minutes, 20 minutes, 30 minutes, or the like. In an instance, for each PRB utilization, a number of 180 kHz frequency space may be utilized for the purpose of using as a non-anchor carrier. Further, based on the PRB utilization for the pre-defined time interval, the PMS (108) may evaluate the available number of non-anchor carriers along with the ARFCN number by the LTE eNB (104).

At step 314, the LTE eNB (104) may request for cumulative NACK percentage report of the ARFCN or the PRB for the NB-IoT eNB (106). At step 316, the NB-IoT eNB (106) further transmits the request of the cumulative NACK percentage report to the MME (110). At step (318) the MME (110) may transmit the requested cumulative NACK percentage report as a response to the NB-IoT eNB (106). The cumulative NACK percentage report for a particular ARFCN or the PRB is available at the MME (110) based on the NACK percentage report shared by the NB-IoT eNB (106). At step 320, the NB-IoT eNB (106) may transmit the cumulative NACK percentage report to the LTE eNB (104).

At step 322, based on the PRB utilization data (120) and the NACK percentage report, a best possible ARFCN or the PRB may be decided for the NB-IoT. The pre-defined value for at least one of the ARFCN or the PRB is based on the best possible ARFCN or the PRB. For instance, the NB-IoT eNB (106) may fetch the cumulative NACK percentage report from MME (110) which may include the cumulative report of all available non-anchor carriers for all available NB-IoT enabled devices (130), so that LTE eNB (104) may make available for one of a best possible ARFCN or the at least one PRB and share the availability to the NB-IoT eNB (106). For example, if LTE eNB (104) can allocate only 3 PRB or ARFCN considering PRB utilization then, the LTE eNB (104) may make available best performing ARFCN or the PRB for non-anchor carrier utilization, as shown in Table 1 below:

TABLE 1

| Time | Cell Identity (ID) | Average PRB utilization | Number of carriers evaluated as non-anchor | EARFCN numbers |
| --- | --- | --- | --- | --- |
| 13:00-13:15 | 1 | 60 | 3 | C1, C2, C3 |
| 13:15-13:30 | 1 | 50 | 4 | C1, C2, C3, C4 |
| 13:30-13:45 | 1 | 30 | 6 | C1, C2, C3, C4, C5, C6 |
| 13:45-14:00 | 1 | 40 | 5 | C1, C2, C3, C4, C5 |

The ARFCN may also be, and referred to as Evolved Universal Mobile Telecommunications System (UMTS) Terrestrial Radio Access (E-UTRA) ARFCN (i.e., EARFCN) as shown in the above table 1.

Further, the best possible EARFCN or the PRB may be available at the NB-IoT eNB (106). For instance, whenever any NB-IoT enabled devices (130) with multi-carrier support initiate UL or DL data transfer, the NB-IoT eNB (106) before configuring the particular EARFCN as the non-anchor carrier to the NBIOT NB-IoT enabled devices (130), may first negotiate the data of available EARFCN in terms of a NACK percentage report for available ARFCN for that NB-IoT enabled devices (130), as shown in Table 2 below:

TABLE 2

| | ARFCN | UL NACK percentage | DL NACK percentage |
| --- | --- | --- | --- |
| NB-IoT enabled device 1 | C1 | 9 | 8 |
| | C2 | | |
| | C3 | 5 | 4 |
| NB-IoT enabled device 2 | C1 | | |
| | C3 | | |
| NB-IoT enabled device 3 | C2 | | |
| | C3 | | |
| | C4 | | |

For instance, in a situation where no cumulative NACK percentage report may be available from the MME (110), then the NB-IoT eNB (106) may allocate non-anchor carrier based on current utilization of available ARFCN for non-anchor carriers. For example, if 3 ARFCN or the PRB may be available for a non-anchor carrier then the NB-IoT eNB (106) may allocate less utilized PRB as a non-anchor carrier as per fair scheduling. The generated cumulative NACK percentage report may be similar as shown in table 2, where for particular NB-IoT enabled device (130) only previous NACK percentage report for non-anchor carriers may be allocated to that particular NB-IoT enabled device (130) which may be provided by MME (110) to NB-IoT eNB (106).

At step 324, information associated with the best possible ARFCN or the PRB for the upcoming time slot may be transmitted to the NB-IoT eNB (106) by the LTE eNB (104). The NB-IoT eNB (106) may generate a configuration for the corresponding at least one NB-IoT enabled device (130) for a pre-defined time duration from at least one co-located LTE eNB (104). At step 326, the NB-IoT enabled devices (130) with multi-carrier support may initiate Uplink (UL) or Downlink (DL) data transfer. For instance, initiating connection for one of UL or DL data for the pre-defined time duration may be upon turning the power on for the corresponding at least one NB-IoT enabled device (130) and by connecting the at least one NB-IoT enabled device (130) to corresponding at least one NB-IoT network of the NB-IoT eNB (106).

Consequently, at step 328, a request for a NACK percentage report of PRBs for the NB-IoT enabled devices (130) is transmitted from the NB-IoT eNB (106) to the MME (110). At step 330, a response corresponding to the NACK percentage of the NB-IoT enabled devices (130) is received at the NB-IoT eNB (106) from the MME (110). The NB-IoT eNB (106) may analyze one or more NACK percentage reports for the allocated PRB for a corresponding NB-IoT enabled devices (130). The NB-IoT eNB (106) may select the best available PRB for the corresponding NB-IoT enabled devices (130) for allocating the PRB as the non-anchor carrier based on an analysis result of the one or more NACK percentage reports. For instance, the NB-IoT eNB (106) may configure the best non-anchor carrier to NB-IoT enabled devices (130) based on the NACK percentage report. For example, referring to above table 2, if C1, C2, C3, C4 carriers are available for non-anchor allocation in the particular time slot and the NACK percentage report received for particular NB-IoT enabled devices (130) has C1 NACK percentage as 8% (DL) and 9% (UL), C3 NACK percentage as 4% (DL) and 5% (UL), and C2, C4 report for a NB-IoT enabled devices (130) as unknown, then the NB-IoT eNB (106) may allocate less utilized ARFCN or the PRB as the non-anchor carrier. Further, if a report for all available ARFCN or the PRB are available for a particular NB-IoT enabled device (130), then the NB-IoT eNB (106) may decide based on ARFCN or the PRB having a smaller error percentage. Further, a NACK percentage threshold value may be selected to avoid allocation of the non-anchor carrier for particular NB-IoT enabled devices (130) in case the non-anchor carrier is not utilized, but having higher NACK percentage for that NB-IoT enabled devices (130) among the available ARFCN or the PRB for the non-anchor carrier. Further, the NACK percentage threshold for UL and DL may be set to reconfigure the non-anchor carrier for particular NB-IoT enabled devices (130) in case the NACK percentage for allocated non-anchor carrier exceeds the threshold for a certain period in an ongoing data transfer/session. Hence, the NB-IoT eNB (106) may select a potential ARFCN or the PRB for particular NB-IoT enabled devices (130) for utilizing as the non-anchor carrier.

At step 332 notification is generated by the NB-IoT eNB (106) and transmitted to the LTE eNB (104) representing usage of the ARFCN or the PRB as the non-anchor carrier. At step 334, an acknowledgment for the generated notification is received by the NB-IoT eNB (106) transmitted by the LTE eNB (104). For instance, upon receiving the notification about ARFCN or the PRB used as a non-anchor carrier, the LTE eNB (104) may transmit back Acknowledgement (ACK) or Negative-Acknowledgement (NACK) message to the NB-IoT eNB (106). If ACK is received, the NB-IoT eNB (106) may utilize these ARFCN or the PRBs as the non-anchor carrier to schedule NB-IoT enabled device (130) for UL or the DL data transfer for the pre-defined timeslot. The LTE eNB (104) may utilize these PRBs to schedule any data to the LTE-enabled devices (not shown in FIG. 3) during the pre-defined timeslot. For example, the pre-defined timeslot maybe 15 minutes which may be the configurable duration. If NACK is received then the NB-IoT eNB (106) may not be able to utilize these PRBs to schedule as a non-anchor carrier to NB-IoT enabled device (130).

At step 336, based on the NACK percentage of the NB-IoT enabled devices (130), PRB may be selected and allocated to the NB-IoT enabled devices (130) via Radio Resource Control (RRC) reconfiguration connection. At step 338, every RRC release of a particular NB-IoT enabled device (130), the NACK percentage report of the ARFCN or the PRB per NB-IoT enabled devices (130) may be transmitted by the NB-IoT eNB (106) to the MME (110). The NB-IoT eNB (106) may allocate non-anchor carrier for enabling the completion of data transfer for the NB-IoT enabled devices (130). In an instance, there may always be a fixed number of ARFCNs in a particular LTE frequency band which may be allocated for the non-anchor carrier.

At step 340, end of the allocated PRB time slot. At step 342, a release indication may be sent to the LTE eNB (104) by the NB-IoT eNB (106), after the end of the allocated PRB time slot. For instance, the NB-IoT eNB (106) may send NACK percentage report of the non-anchor carrier for each NB-IoT enabled device (130) for each data transfer/session on each RRC release, to the MME (110). The MME (110) may collect the data of NACK percentage for each NB-IoT enabled device (130) for each non-anchor ARFCN for the configurable count. The release indication is sent to the LTE eNB (104) by the NB-IoT eNB (106), so that the LTE eNB (104) may utilize these ARFCN for scheduling data to the LTE enabled devices (not shown in FIG. 3). If the same EARFCN is being notified for the next pre-defined time interval, then the release indication may not be notified for that ARFCN by the NB-IoT eNB (106) to LTE eNB (104). Consequently, if any EARFCN may be in use at the end of the slot then release indication of that EARFCN may be sent as soon as the non-anchor carrier is released for the NB-IoT enabled devices (130), which may be utilizing the EARFCN. The LTE eNB (104) may not schedule data on the PRB or the EARFCN until the LTE eNB (104) is notified with release indication from the NB-IoT eNB (106).

Further, if PRB is allocated, then the NB-IoT eNB (106) may transmit a PRB release notification to the LTE eNB (104) for each of the PRB upon completion of the pre-defined time interval. For example, when the LTE eNB (104) provides the best available ARFCN or the PRB as the non-anchor carrier, then the availability of resources at NB-IoT eNB (106) may be provided to the SCEF (124) (shown in FIG. 1). The SCEF (124) may use the provided availability of resources at NB-IoT eNB (106) to provide the Service Capability Server (SCS) (not shown in FIG. 3) or Application Server (AS) (128) (shown in FIG. 1) with a set of policy(s) that may indicate the best time(s) to perform the data transfer exceeding certain threshold period and for the data transfer amount and number of NB-IoT enabled devices (130) for data transfer.

Figure 4:
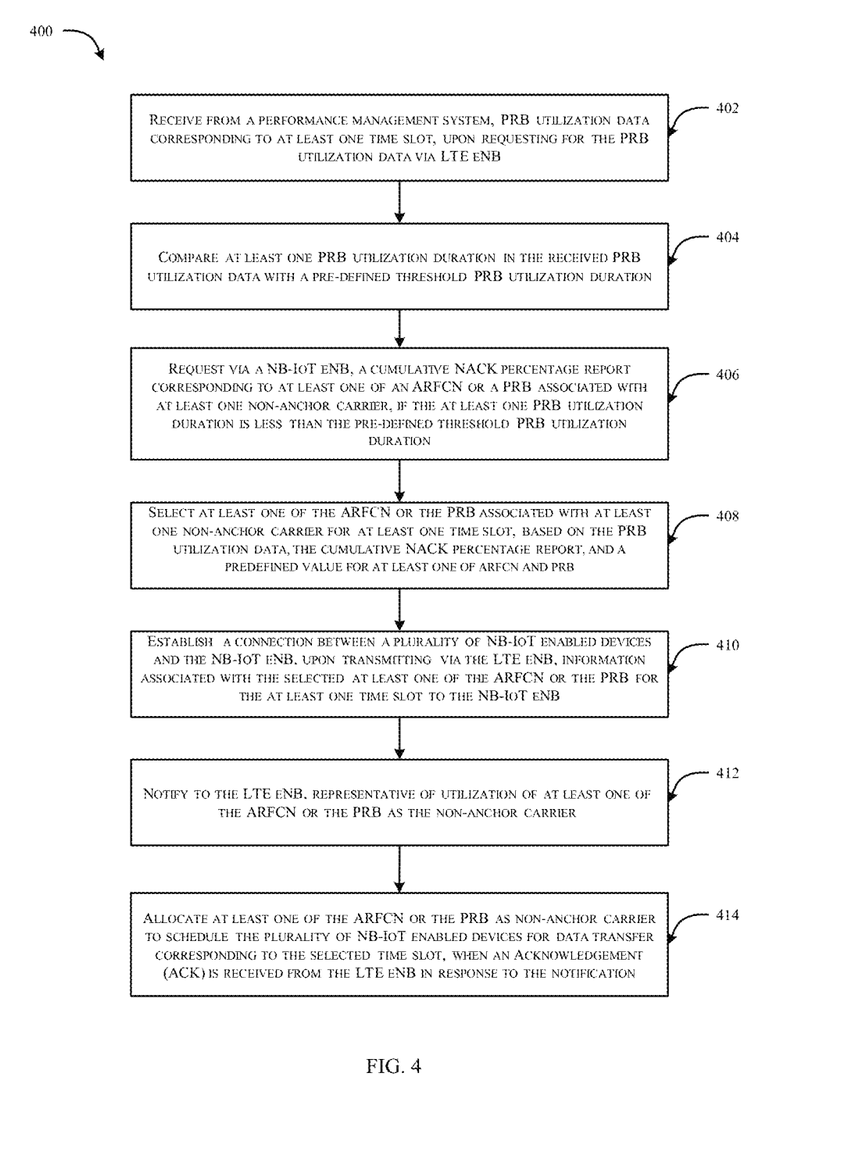
FIG. 4 illustrates an exemplary method flow chart depicting a method for dynamic multicarrier allocation to NB-IoT enabled devices, in accordance with an embodiment of the present disclosure.

FIG. 4 illustrates an exemplary method flow chart depicting a method (400) for dynamic multicarrier allocation to NB-IoT enabled devices (130), in accordance with an embodiment of the present disclosure.

As illustrated in FIG. 4, the method (400) includes one or more blocks illustrating a method of dynamic multicarrier allocation to NB-IoT enabled devices (130). The method (400) may be described in the general context of computer-executable instructions. Generally, computer-executable instructions can include routines, programs, objects, components, data structures, procedures, modules, and functions, which perform functions or implement abstract data types.

The order in which the method (400) is described is not intended to be construed as a limitation, and any number of the described method blocks can be combined in any order to implement the method (400). Additionally, individual blocks may be deleted from the methods without departing from the scope of the subject matter described herein. Furthermore, the method (400) can be implemented in any suitable hardware, software, firmware, or combination thereof.

At block (402), the method (400) may include receiving, by a processor (202), from the PMS (108), Physical Resource Block (PRB) utilization data (120) corresponding to at least one of at least one-time slot and a set of data packets, upon requesting for the PRB utilization data (120) via a Long-Term Evolution evolved Node B (LTE eNB) (104). At block (404), the method (400) may include comparing, by the processor (202), at least one PRB utilization duration in the received PRB utilization data (120) with a pre-defined threshold PRB utilization duration. At block (406), the method (400) may include requesting, by the processor (202), via a Narrow Band Internet of Things evolved Node B (NB-IoT eNB) (106), a cumulative Negative Acknowledgement (NACK) percentage report corresponding to at least one of an Absolute Radio Frequency Channel Number (ARFCN) or a PRB associated with at least one non-anchor carrier (114), if the at least one PRB utilization duration is less than the pre-defined threshold PRB utilization duration.

At block (408), the method (400) may include selecting, by the processor (202), at least one of the ARFCN or the PRB associated with at least one non-anchor carrier (114) for at least one of at least one-time slot and a set of data packets, based on the PRB utilization data (120), the cumulative NACK percentage report, and a pre-defined value for at least one of the ARFCN or the PRB. At block (410), the method (400) may include establishing, by the processor (202), a connection between a plurality of NB-IoT enabled devices (130) and the NB-IoT eNB (106), upon transmitting via the LTE eNB (104), information associated with the selected at least one of the ARFCN or the PRB for the at least one-time slot to the NB-IoT eNB (106).

At block (412), the method (400) may include notifying, by the resource processor (202), to the LTE eNB (104), representative of the utilization of at least one of the ARFCN or the PRB as the non-anchor carrier (114). At block (414), the method (400) may include allocating, by the processor (202), at least one of the ARFCN or the PRB as the non-anchor carrier (114) to schedule the plurality of NB-IoT enabled devices (130) for data transfer corresponding to the selected time slot, when an Acknowledgement (ACK) is received from the LTE eNB (104) in response to the notification.

Various embodiments of the present disclosure enable maximum utilization of radio resources available to the operator across LTE and NB-IoT. Embodiments herein increase NB-IoT cell and user throughput. Additional data input provided to Service Capability Exposure Function (SCEF) may be utilized for optimum utilization of NB-IoT resources. Embodiments herein allocate at least one of the ARFCN or the PRB as a non-anchor carrier to schedule the plurality of NB-IoT enabled devices for data transfer corresponding to the selected time slot, when an ACK is received from the LTE eNB, which does not require another frequency space, thereby frequency space and the cost is minimized. Selecting the best ARFCN or the PRB associated with at least one non-anchor carrier for at least one time slot, avoids allocation of the non-anchor carrier for a particular NB-IoT enabled device in case the non-anchor carrier is not utilized but has a higher NACK percentage for that NB-IoT enabled device among the available ARFCN or the PRB for the non-anchor carrier. Selecting ARFCN or the PRB associated with at least one non-anchor carrier for at least one time slot for each of the NB-IoT enabled devices, provides sufficient bandwidth and does not cause a delay in communication from the plurality of NB-IoT enabled devices, even when different NB-IoT devices are used for different applications.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as a limitation.

We claim:

1. A resource allocation system for dynamic multicarrier allocation to Narrow Band-Internet of Things (NB-IoT) enabled devices comprising:
    a processor; and
    a memory communicatively coupled to the processor, wherein the memory stores the processor instructions, which on execution, the processor causes the resource allocation system to:
    receive from a Performance Management System (PMS) communicatively coupled to a Long-Term Evolution evolved Node B (LTE eNB), Physical Resource Block (PRB) utilization data corresponding to at least one of at least one-time slot and a set of data packets, upon requesting for the PRB utilization data via the LTE eNB;
    compare at least one PRB utilization duration in the received PRB utilization data with a pre-defined threshold PRB utilization duration; request via a Narrow Band Internet of Things evolved Node B (NB-IoT eNB), a cumulative Negative Acknowledgement (NACK) percentage report corresponding to at least one of an Absolute Radio Frequency Channel Number (ARFCN) or a PRB associated with at least one non-anchor carrier, if the at least one PRB utilization duration is less than the pre-defined threshold PRB utilization duration;
    select at least one of the ARFCN or the PRB associated with at least one non-anchor carrier for at least one of at least one-time slot and a set of data packets, based on the PRB utilization data, the cumulative NACK percentage report and a pre-defined value for at least one of the ARFCN or the PRB;
    establish a connection between a plurality of NB-IoT enabled devices and the NB-IoT eNB (106), upon transmitting via the LTE eNB, information associated with the selected at least one of the ARFCN or the PRB for at least one of the at least one-time slot and a set of data packets to the NB-IoT eNB;
    notify to the LTE eNB, representative of utilization of at least one of the ARFCN or the PRB as the non-anchor carrier; and
    allocate at least one of the ARFCN or the PRB as a non-anchor carrier to schedule the plurality of NB-IoT enabled devices for data transfer corresponding to the selected time slot, when an Acknowledgement (ACK) is received from the LTE eNB in response to the notification.

2. The resource allocation system as claimed in claim 1 is further configured to indicate to the LTE eNB, release of each of at least one of the ARFCN or the PRB at the end of the allocated time slot.

3. The resource allocation system as claimed in claim 1, wherein for requesting the cumulative NACK percentage report corresponding to at least one of the ARFCN or the PRB, the resource allocation system is further configured to:
    transmit the request for the cumulative NACK percentage report to a Mobility Management Entity (MME) via the NB-IoT eNB; and receive from the MME, the requested cumulative NACK percentage report via the NB-IoT eNB, in response to the transmitted request.

4. The resource allocation system as claimed in claim 1, wherein for selecting at least one of the ARFCN or the PRB, the resource allocation system is further configured to determine at least one of the less utilized and less error percentage among at least one of the ARFCN or the PRB.

5. The resource allocation system as claimed in claim 1, wherein based on establishing the connection between a plurality of NB-IoT enabled devices and the NB-IoT eNB, the resource allocation system is further configured to:
    request from the NB-IoT eNB via the MME, a NACK percentage report corresponding to at least one of the ARFCN or the PRB for each of the plurality of NB-IoT enabled devices and for each of the ARFCN;
    select and allocate at least one of the ARFCN or the PRB to each of the plurality of NB-IoT enabled devices, using a Radio Resource Control (RRC) reconfiguration connection, based on the NACK percentage of each of the plurality of NB-IoT enabled devices;
    perform a RRC release for each of the plurality of NB-IoT enabled devices; and
    transmit a NACK percentage report corresponding to at least one of the ARFCN or the PRB of each of the plurality of NB-IoT enabled devices to the MME via the NB-IoT eNB, upon the RRC release.

6. The resource allocation system as claimed in claim 5, wherein upon requesting the NACK percentage report, if the NACK percentage report is not available in the MME, then the resource allocation system via the NB-IoT eNB allocates the non-anchor carrier based on a current utilization of available ARFCN for the non-anchor carriers.

7. The resource allocation system as claimed in claim 1, wherein for establishing the connection between the plurality of NB-IoT enabled devices and the NB-IoT eNB, the resource allocation system is further configured to:
    negotiate data of available ARFCN in respect of the received NACK percentage report for available ARFCN for the each of the plurality of NB-IoT enabled devices;
    generate a configuration for each of the plurality of NB-IoT enabled devices for the selected time slot;
    configure each of the ARFCN as the non-anchor carrier to the each of the plurality of NB-IoT enabled devices; and reconfigure the non-anchor carrier for each of the plurality of NB-IoT enabled devices, when a NACK percentage of the non-anchor carrier exceeds a pre-defined threshold for a certain duration during the data transfer.

8. A method for dynamic multicarrier allocation to Narrow Band-Internet of Things (NB-IoT) enabled devices comprising:
  receiving, by a processor, from a Performance Management System (PMS) communicatively coupled to a Long-Term Evolution evolved Node B (LTE eNB), Physical Resource Block (PRB) utilization data corresponding to at least one of at least one-time slot and a set of data packets, upon requesting for the PRB utilization data via the LTE eNB;
  comparing, by the processor, at least one PRB utilization duration in the received PRB utilization data with a pre-defined threshold PRB utilization duration;
  requesting, by the processor, via a Narrow Band Internet of Things evolved Node B (NB-IoT eNB), a cumulative Negative Acknowledgement (NACK) percentage report corresponding to at least one of an Absolute Radio Frequency Channel Number (ARFCN) or a PRB associated with at least one non-anchor carrier, if the at least one PRB utilization duration is less than the pre-defined threshold PRB utilization duration;
  selecting, by the processor, at least one of the ARFCN or the PRB associated with at least one non-anchor carrier for at least one of at least one-time slot and a set of data packets, based on the PRB utilization data, the cumulative NACK percentage report and a pre-defined value for at least one of the ARFCN or the PRB;
  establishing, by the processor, a connection between a plurality of NB-IoT enabled devices and the NB-IoT eNB, upon transmitting via the LTE eNB, information associated with the selected at least one of the ARFCN or the PRB for at least one of the at least one-time slot and a set of data packets to the NB-IoT eNB;
  notifying, by the processor, to the LTE eNB, representative of utilization of at least one of the ARFCN or the PRB as the non-anchor carrier; and
  allocating, by the processor, at least one of the ARFCN or the PRB as a non-anchor carrier to schedule the plurality of NB-IoT enabled devices for data transfer corresponding to the selected time slot, when an Acknowledgement (ACK) is received from the LTE eNB in response to the notification.

9. The method as claimed in claim 8 further comprises indicating, by the processor, release of each of at least one of the ARFCN or the PRB at the end of the allocated time slot to the LTE eNB.

10. The method as claimed in claim 8, wherein requesting the cumulative NACK percentage report corresponding to at least one of the ARFCN or the PRB further comprises:
  transmitting, by the processor, the request for the cumulative NACK percentage report to a Mobility Management Entity (MME) via the NB-IoT eNB; and
  receiving, by the processor, from the MME, the requested cumulative NACK percentage report via the NB-IoT eNB, in response to the transmitted request.

11. The method as claimed in claim 8, wherein selecting at least one of the ARFCN or the PRB further comprises determining, by the processor, at least one of the less utilized and less error percentage among at least one of the ARFCN or the PRB.

12. The method as claimed in claim 8, wherein based on establishing the connection between a plurality of NB-IoT enabled devices and the NB-IoT eNB, the method further comprises:
  requesting, by the processor, from the NB-IoT eNB via the MME, a NACK percentage report corresponding to at least one of the ARFCN or the PRB for each of the plurality of NB-IoT enabled devices (130) and for each of the ARFCN;
  selecting, by the processor, and allocate at least one of the ARFCN or the PRB to each of the plurality of NB-IoT enabled devices,
  using a Radio Resource Control (RRC) reconfiguration connection, based on the NACK percentage of each of the plurality of NB-IoT enabled devices; performing, by the processor, a RRC release for each of the plurality of NB-IoT enabled devices; and
  transmitting, by the processor, a NACK percentage report corresponding to at least one of the ARFCN or the PRB of each of the plurality of NB-IoT enabled devices to the MME via the NB-IoT eNB, upon the RRC release.

13. The method as claimed in claim 12, wherein upon requesting the NCK percentage report, if the NACK percentage report is not available in the MME, then the resource allocation system via the NB-IoT eNB allocates the non-anchor carrier based on a current utilization of available ARFCN for the non-anchor carriers.

14. The method as claimed in claim 8, wherein establishing the connection between the plurality of NB-IoT enabled devices and the NB-IoT eNB further comprises:
  negotiating, by the processor, data of available ARFCN in respect of the received NACK percentage report for available ARFCN for the each of the plurality of NB-IoT enabled devices;
  generating, by the processor, a configuration for each of the plurality of NB-IoT enabled devices for the selected time slot;
  configuring, by the processor, each of the ARFCN as the non-anchor carrier to the each of the plurality of NB-IoT enabled devices; and
  reconfiguring, by the processor, the non-anchor carrier for each of the plurality of NB-IoT enabled devices, when a NACK percentage of the non-anchor carrier exceeds a pre-defined threshold for a certain duration during the data transfer.

* * * * *